Figure 1A:
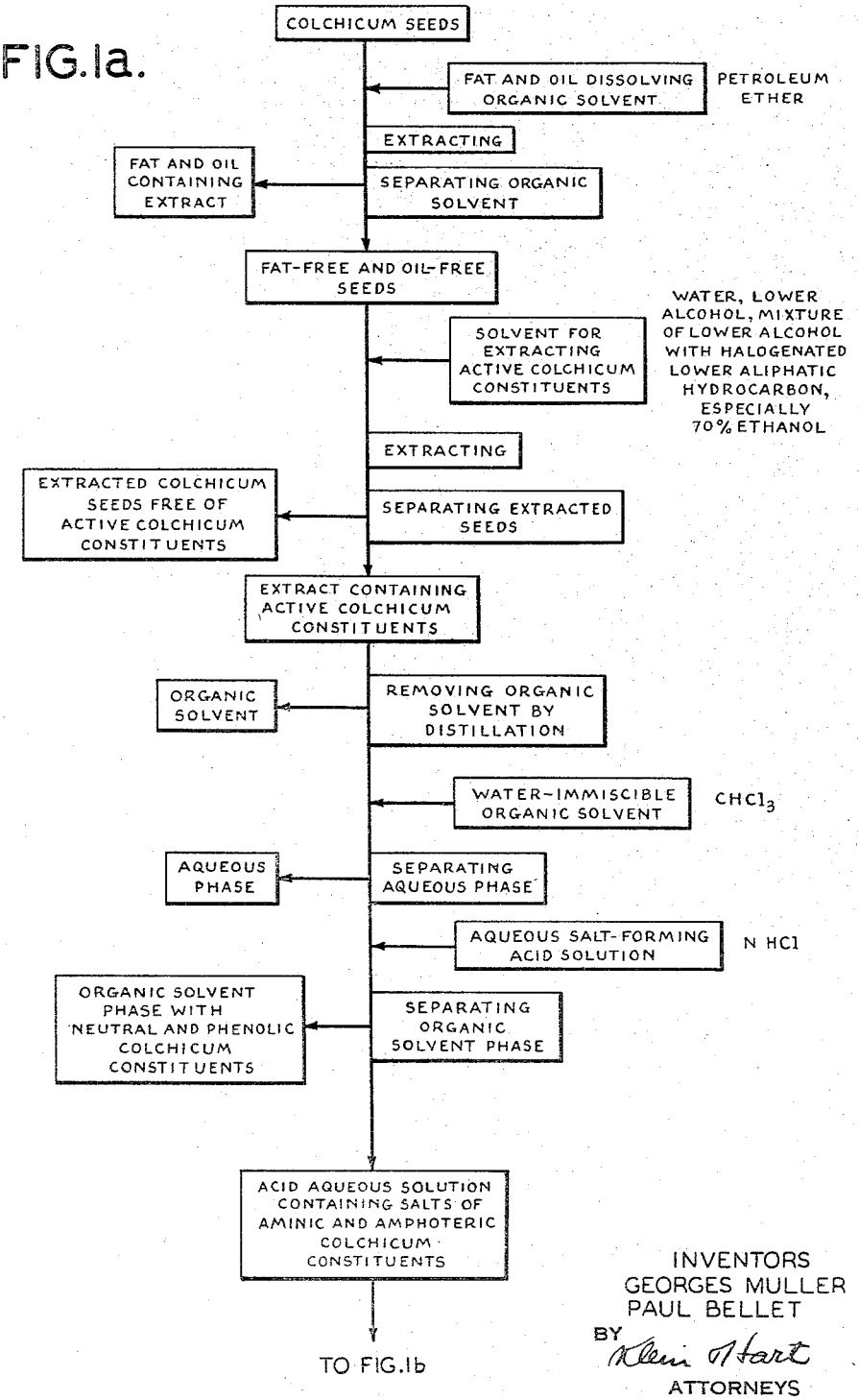

INVENTORS
GEORGES MULLER
PAUL BELLET
BY
ATTORNEYS

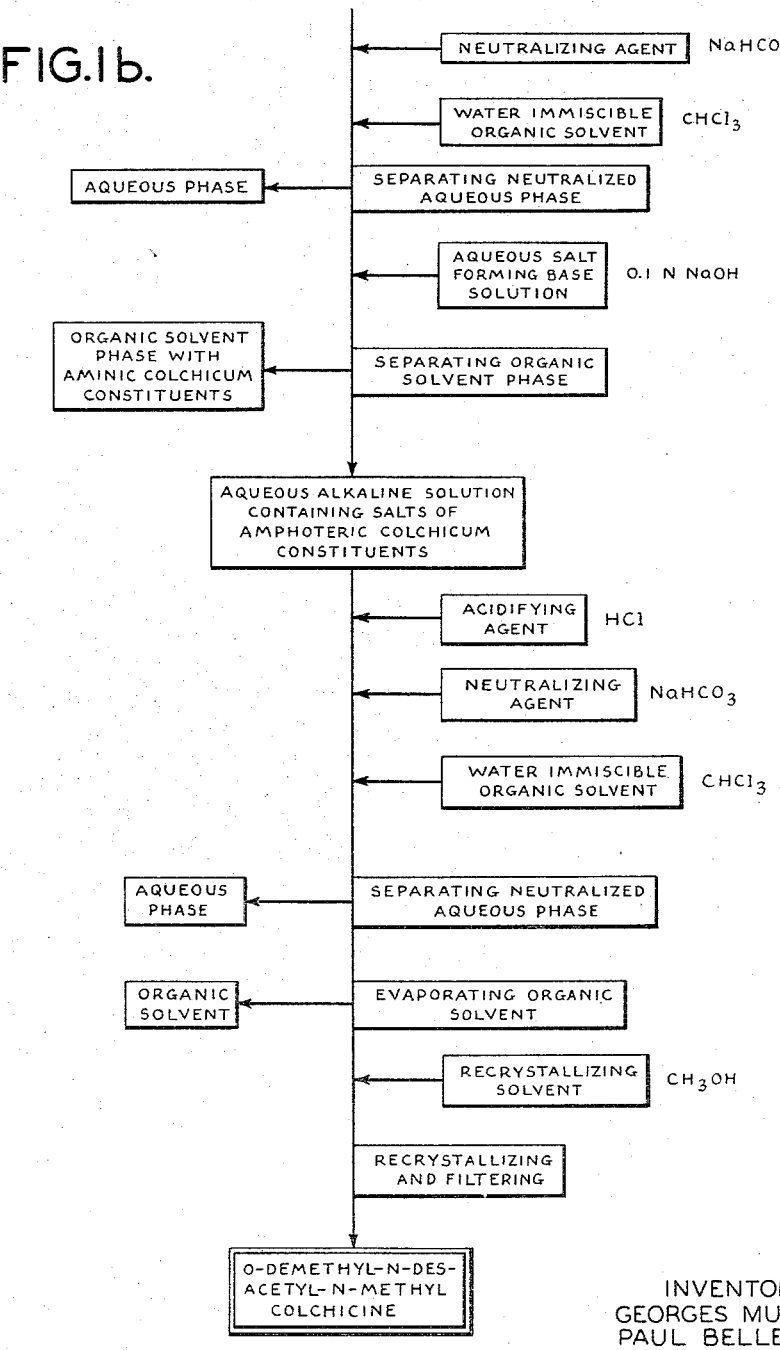

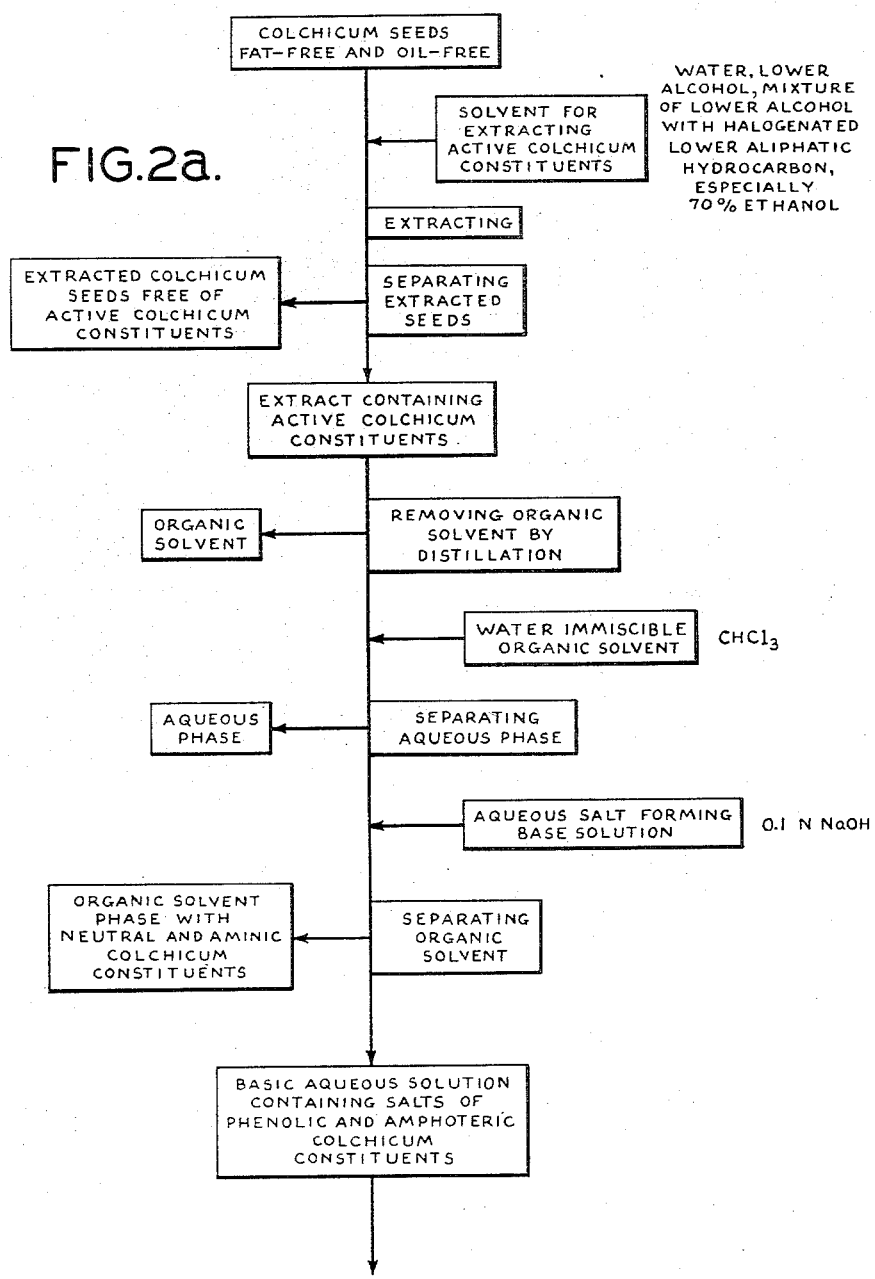

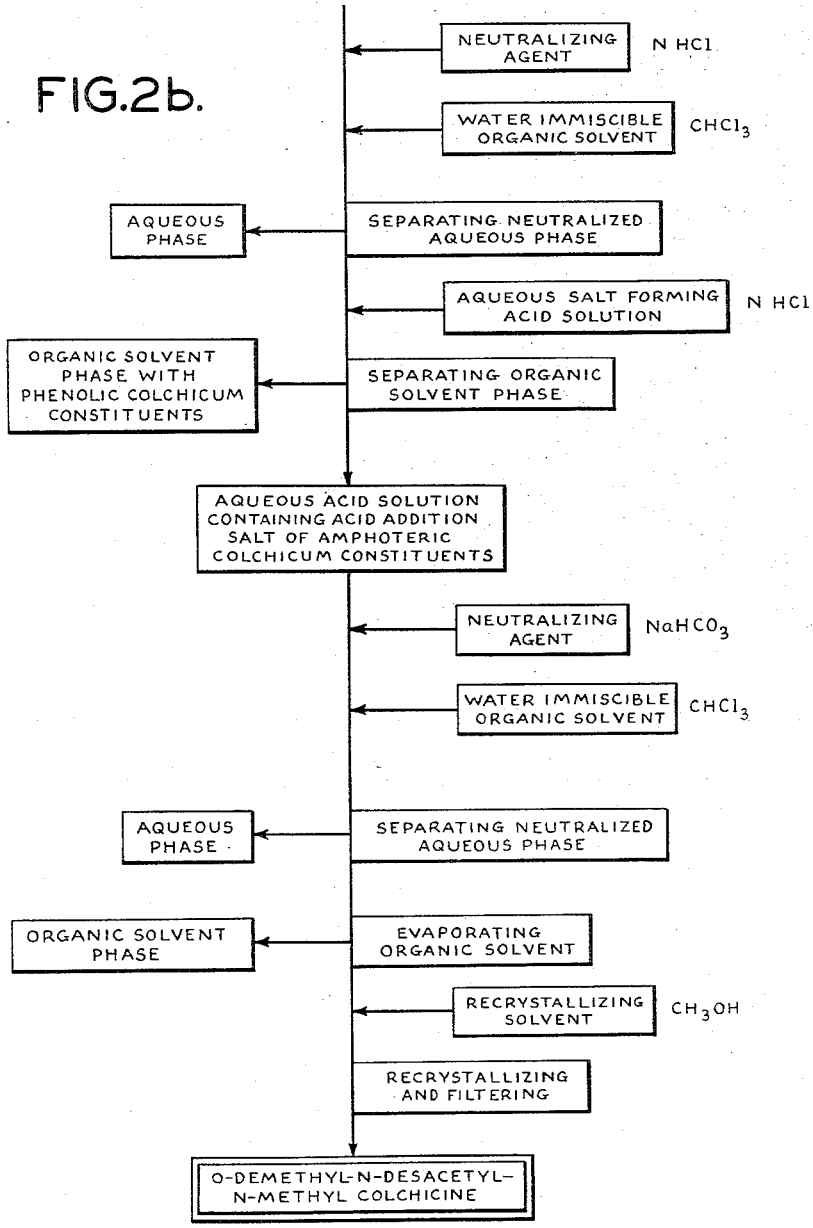

2,950,311

O-DEMETHYL-N-DESACETYL-N-METHYL COLCHICINE AND A PROCESS OF MAKING SAME

Georges Muller, Nogent-sur-Marne, and Paul Bellet, Paris, France, assignors to UCLAF, Paris, France, a corporation of France Filed Oct. 27, 1955, Ser. No. 543,193

Claims priority, application France Nov. 3, 1954

6 Claims. (Cl. 260—476)

The present invention relates to a new active compound obtained from plants of the genus Colchicum and more particularly to O-demethyl-N-desacetyl-N-methyl colchicine, and to a process of making same.

On extracting the plant *Colchicum autumnale* by means of alcohol, there are obtained three characteristic fractions. The first fraction which is of neutral reaction contains colchicine, colchicoside, and other related compounds. The second fraction of amine character contains N-desacetyl-N-methyl colchicine. From the third fraction, which is of phenolic nature, 2-demethyl colchicine, i.e., substance C, has been isolated as the main constituent.

It is one object of the present invention to prepare from plants of the genus Colchicum a new compound which is distinctly different from all the above mentioned heretofore known compounds and which is, at the same time, of phenolic nature and of the nature of a methyl amine. This amphoteric characteristic is encountered for the first time in the series of compounds derived from Colchicum.

Another object of the present invention is to provide a new process of preparing said amphoteric compound derived from Colchicum plants and of separating it from the other Colchicum compounds in a simple, economic, and effective manner.

A further object of the present invention is to provide a new acetylation product of said O-demethyl-N-desacetyl-N-methyl colchicine, namely the acetate of O-demethyl-N-methyl colchicine.

Still another object of the present invention is to provide a new O-demethyl-N-desacetyl-N-methyl colchiceine compound by acid hydrolysis of O-demethyl-N-desacetyl-N-methyl colchicine, and the characteristic tribenzoate of said colchiceine compound.

Other objects of the present invention and advantageous features thereof will become apparent as the description proceeds.

In principle, the process according to the present invention consists in first treating finely pulverized Colchicum seeds, from which the oily and fatty constituents have been removed, with a solvent or a mixture of solvents that are capable of dissolving all the active constituents present in said seeds. Thereafter, the new amphoteric O-demethyl-N-desacetyl-N-methyl colchicine is separated from the neutral, phenolic, and aminic extracted Colchicum constituents by allowing said compound to pass from an organic phase into an aqueous phase successively in the form of its acid addition salt and especially in the form of its hydrochloride or in the form of its salt with a base and especially in the form of its sodium salt so as to separate it from the phenolic and the aminic accompanying Colchicum constituents. This separation is achieved by extracting solutions of the Colchicum constituents in an organic water-immiscible solvent first with an acid aqueous solvent and then with an alkaline aqueous solvent, or vice versa, first with an alkaline aqueous solvent and then with an acid aqueous solvent.

Water, a lower alkanol, or a mixture of a lower alkanol with a lower halogenated aliphatic hydrocarbon are used as solvents for extracting the active constituents from oil- and fat-free Colchicum seeds. Aqueous 70% ethanol has proved to be of particular value for this purpose.

After extraction of the oil- and fat-free, finely pulverized Colchicum seeds with such an aqueous 70% ethanol, the ethanol is distilled off in a vacuum and the remaining aqueous phase is extracted by means of a water-immiscible solvent, preferably by means of chloroform. The chloroform solution is then thoroughly extracted with an aqueous acid solution, preferably with N hydrochloric acid. The aqueous acid extract contains all the Colchicum amines and also the amphoteric Colchicum constituents in the form of their hydrochlorides. Said phase is neutralized by the addition of sodium bicarbonate and is again extracted with chloroform, thereby yielding a chloroform solution which is rich in N-desacetyl-N-methyl colchicine, i.e., substance F of Formula IV given hereinafter and in other basic substances such as the amphoteric constituents. By rapidly extracting said chloroform solution in the cold by means of a base capable of forming salts with phenols and especially by means of 0.1 N sodium hydroxide solution which does not affect the N-desacetyl-N-methyl colchicine but dissolves the amphoteric constituents, an aqueous solution of said amphoteric constituents in the form of their sodium salts is obtained. Said aqueous solution is immediately acidified by means of hydrochloric acid and is then neutralized by means of sodium bicarbonate. The neutralized aqueous solution contains only the amphoteric constituents of Colchicum. O-demethyl - N - desacetyl - N - methyl colchicine is extracted therefrom by means of chloroform and is recrystallized from methanol.

The resulting compound represents a product which contains solvent of crystallization and loses about 9.5% of its weight by heating in a vacuum to 137° C. and which melts at about 131° C. Its rotatory power $[\alpha]_D^{20}$ is $-109°$ $\pm 5°$ (concentration $=1\%$ in chloroform). Said compound corresponds to the general formula $C_{20}H_{23}O_5N$ and combines phenolic nature with the nature of a methylamine.

The structure of the new O-demethyl-N-desacetyl-N-methyl colchicine of the following Formula I

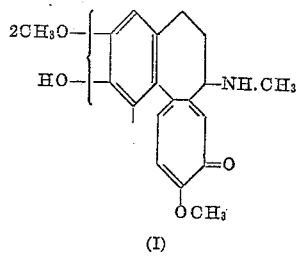

(I)

with the exception of the position of the free phenolic group, is proven by the following reactions.

Acetylation yields an N,O-diacetate of Formula III. Said diacetate melts at 223° C. and has a rotatory power $[\alpha]_D^{20} = -229° \pm 5°$ (concentration $=0.5\%$ in chloroform). The compound corresponds to the general formula $C_{24}H_{27}O_7N$.

Acid hydrolysis yields the O-demethyl-N-desacetyl-N-methyl colchiceine of Formula IIa which is characterized by its tribenzoate of Formula IIb corresponding to the general formula $C_{40}H_{33}O_8N$. Its melting point is 232° C., its rotatory power $[\alpha]_D^{20} = -272° \pm 5°$ (concentration $=0.5\%$ in chloroform).

Methylation of O-demethyl-N-desacetyl-N-methyl colchicine of Formula I by means of diazomethane yields N-desacetyl-N-methyl colchicine of Formula IV and the melting point 183–185° C. Said methylation product is identical with demecolcine as it has been obtained by extracting Colchicum plants according to known processes. N-desacetyl-N-methyl colchicine of Formula IV can readily be converted by acetylation into N-methyl colchicine of Formula V, having the melting point 227° C.

The following formulas clearly indicate the reactions disclosed hereinabove and the conversion of O-demethyl-N-desacetyl-N-methyl colchicine in the above mentioned compounds.

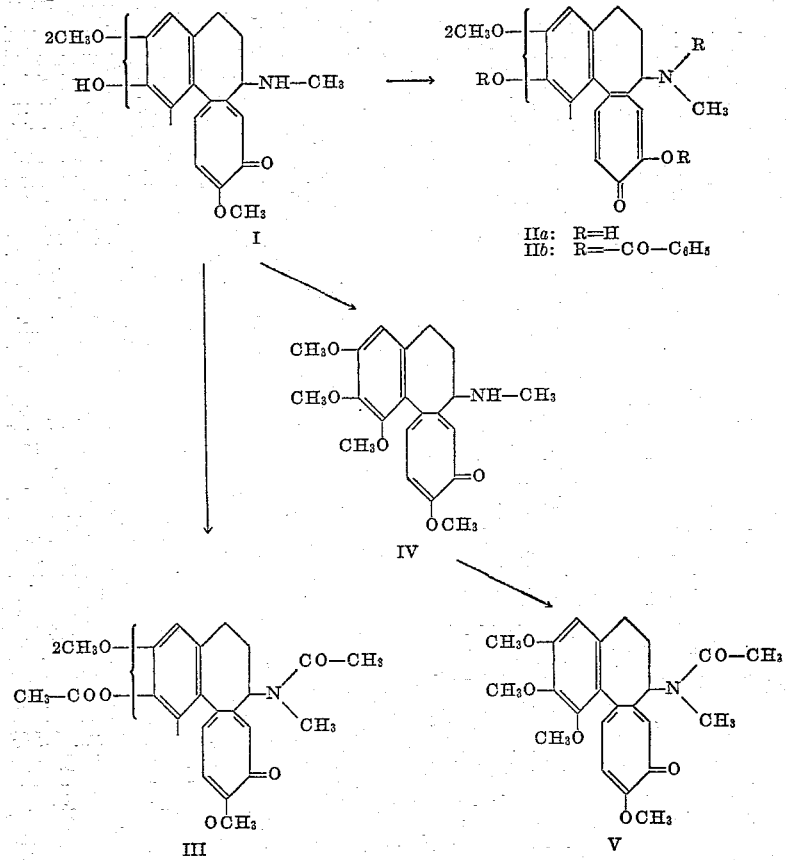

The new O-demethyl-N-desacetyl-N-methyl colchicine is used in biology, agriculture, and industry especially for its ability of modifying cell division (mitosis) and of causing doubling of chromosomes (polyploidism). It is applied in the form of aqueous solutions or of suspensions of its derivatives, for instance, to soil on which vegetables and other agricultural plants are cultivated. It can also be used for a preliminary treatment of seeds of such vegetables and other agricultural plants, either in its pure form or in diluted form in a solvent or with a carrier.

The following examples illustrate the present invention without, however, limiting the same thereto.

EXAMPLE 1

*Extraction of O-demethyl-N-desacetyl-N-methyl colchicine*

150 kg. of finely pulverized Colchicum seed are freed from oil and fat by extraction with 500 liters of petroleum ether. The oil- and fat-free seeds are then extracted in the cold by means of 700 liters of 70% ethanol. The ethanol is removed by vacuum distillation and the resulting aqueous solution is extracted five times with 35 liters of chloroform. The chloroform extracts are combined and are stirred 3 times with 10 liters of N hydrochloric acid. The acid aqueous phase is separated each time from the chloroform layer. The combined acid aqueous extracts are neutralized by the addition of a saturated solution of sodium bicarbonate. The neutralized solution is again treated 4 times with 2 liters of chloroform. The chloroform extracts are combined and are extracted in the cold 4 times with 250 cc. of 0.1 N sodium hydroxide solution and then with 500 cc. of water. The aqueous alkaline solutions are combined and are acidified by means of hydrochloric acid. The acidified solution is then neutralized by the addition of sodium bicarbonate. The resulting neutral solution is finely extracted 5 times with 200 cc. of chloroform. The combined chloroform extracts are dried over magnesium sulfate and are evaporated to dryness in a vacuum. In this manner 5.9 g. of an evaporation residue are obtained which, on trituration with a small amount of methanol, yields 2.8 g. of crystalline O-demethyl-N-desacetyl-N-methyl colchicine containing solvent of crystallization. Said product melts at 131° C., its rotatory power $[\alpha]_D^{20} = -104° \pm 5°$ (concentration=1% in chloroform). On recrystallization from methanol a compound is obtained which melts at 131° C. and has a rotatory power $[\alpha]_D^{20} = -109° \pm 5°$ (concentration=1% in chloroform).

The Flow Sheet I shows the various steps which lead to the separation of neutral, aminic, phenolic, and amphoteric Colchicum constituents from each other and to the preparation of O-demethyl-N-desacetyl-N-methyl colchicine.

The Flow Sheet II shows a modification of the process described in Example 1. In said modification first the neutral and aminic constituents of Colchicum are separated by treating the solution of all the Colchicum constituents in chloroform with an aqueous sodium hydroxide solution. The sodium salts of the phenolic and amphoteric constituents of Colchicum are then separated by extracting the phenolic constituents from the acidified aqueous solution by means of chloroform, leaving only the amphoteric constituents in the aqueous solution from which it can readily be recovered in the pure form.

Analysis: $C_{20}H_{23}O_5N$. Molecular weight: 357.4.

The compound, on drying in a vacuum at 137° C., loses 9.5% of solvent of crystallization.

Calculated: 67.2% C; 6.5% H; 3.9% N; 26.0% OCH$_3$.
Found: 67.5% C; 6.7% H; 3.9% N; 25.3% OCH$_3$.

EXAMPLE 2

*Diacetate of O-demethyl-N-desacetayl-N-methyl colchicine*

400 mg. of O-demethyl-N-desacetyl-N-methyl colchicine are treated at 20° C. with 8 cc. of acetic acid anhydride in the presence of 8 cc. of pyridine for 16 hours. The reaction mixture is then poured into water. The aqueous mixture is extracted with chloroform, and the chloroform solution is successively washed with N hydrochloric acid, N-sodium hydroxide and finally with water. The washed chloroform solution is dried over magnesium sulfate and is evaporated to dryness in a vacuum. The residue is recrystallized from ethyl acetate and yields 400 mg. of the diacetate of O-demethyl-N-desacetyl-N-methyl colchicine, which may also be called the acetate of O-demethyl-N-methyl colchicine. Said compound has a melting point of 223° C. and a rotatory power $$[\alpha]_D^{20} = -229° \pm 5°$$

(concentration=0.5% in chloroform). The compound is dried for analytical purposes at 100° C. for two hours.
Analysis: $C_{24}H_{27}O_7N$. Molecular weight: 441.5.
Calculated: 65.3% C; 6.2% H; 25.4% O; 3.2% N; 21.1% OCH$_3$. Found: 65.2% C; 6.4% H; 25.5% O; 3.3% N; 20.3% OCH$_3$.

EXAMPLE 3

*Hydrolysis of O-demethyl-N-desacetyl-N-methyl colchicine and preparation of tribenzoyl-O-demethyl-N-desacetyl-N-methyl colchiceine*

A solution of 580 mg. of O-demethyl-N-desacetyl-N-methyl colchicine in 52 cc. of water containing 6 cc. of 2 N hydrochloric acid is heated on the water bath for 2 hours. The reaction mixture is neutralized by the addition of a saturated solution of sodium bicarbonate. The neutralized mixture is extracted by means of a mixture of chloroform and methanol (2:1). The resulting chloroform-methanol solution is washed with 20 cc. of water, dried over magnesium sulfate and evaporated to dryness in a vacuum. The remaining residue is treated in the cold with 2 cc. of benzoyl chloride in the presence of 2 cc. of pyridine. 30 cc. of water are added thereto. The mixture is extracted with chloroform, the chloroform extract is washed first with N hydrochloric acid, then with N sodium hydroxide solution, and finally with water, dried over magnesium sulfate, and evaporated to dryness. 600 mg. of a residue are obtained which are recrystallized from ethyl acetate. Thereby, 260 mg. of tribenzoyl-O-demethyl-N-desacetyl-N-methyl colchiceine are obtained. Said compound melts at 231–232° C. and has a rotatory power $[\alpha]_D^{20} = -272° \pm 5°$ (concentration=0.5% in chloroform). The compound is dried for analytical purposes at 100° C. for two hours.
Analysis: $C_{40}H_{33}O_8N$. Molecular weight: 655.7.
Calculated: 73.3% C; 5.1% H; 19.5% O; 2.1% N; 9.5% OCH$_3$. Found: 73.1% C; 5.2% H; 20.1% O; 2.1% N; 10.1% OCH$_3$.

EXAMPLE 4

*Methylation of O-demethyl-N-desacetyl-N-methyl colchicine*

50 mg. of O-demethyl-N-desacetyl-N-methyl colchicine are dissolved in 5 cc. of a mixture of methanol and chloroform (1:4). The solution is treated with 15 cc. of a toluene solution containing 5% of diazomethane. The reaction mixture is allowed to stand at room temperature for 16 hours. Excess diazomethane is destroyed by the addition of a few drops of acetic acid. The solution is washed with 5 cc. of N sodium hydroxide solution and then with water, dried over magnesium sulfate, and evaporated to dryness in a vacuum. The evaporation residue is recrystallized from ethyl acetate and yields 30 mg. of crude N-desacetyl-N-methyl colchicine of the melting point 177–180° C. Said compound is purified by chromatographic treatment over two grams of neutral aluminum oxide. The residue resulting from evaporation of the chloroform eluate is recrystallized from ethyl acetate and yields 10 mg. of N-desacetyl-N-methyl colchicine of the melting point 183–185° C. Said compound is identical with N-desacetyl-N-methyl colchicine obtained by extraction of Colchicum plants according to known methods.

EXAMPLE 5

*Preparation of N-methyl colchicine by acetylation of N-desacetyl-N-methyl colchicine*

6 mg. of the methylation product of O-demethyl-N-desacetyl-N-methyl colchicine prepared according to Example 4, are dissolved in 0.5 cc. of pyridine. 0.5 cc. of acetic acid anhydride are added thereto. The reaction mixture is allowed to stand at 16° C. overnight, is poured into 5 cc. of water, and is extracted with chloroform. The chloroform extract is first washed with hydrochloric acid, then with sodium bicarbonate, and finally with water, and is evaporated to dryness in a vacuum after drying over magnesium sulfate. The residue crystallizes after addition of one drop of ethyl acetate. The crystals are filtered and washed with ethyl acetate. Thereby 1.5 mg. of N-methyl colchicine melting at 225° C. are obtained. Said compound is identical with N-methyl colchicine prepared from an authentic sample of N-desacetyl-N-methyl colchicine obtained by extraction of Colchicum plants, by acetylation in the same manner as described hereinabove.

In place of chloroform used in Example 1 as the water-immiscible solvent, there can be employed other water-immiscible solvents, provided they are capable of dissolving the Colchicum constituents in the free, i.e., neutral, phenolic, or aminic state, such as other halogenated lower alkanes, and alkenes, for instance, tetrachlorethane, trichloro ethylene.

In place of hydrochloric acid, there can be used other strong acids which are capable of forming acid addition salts with the aminic and amphoteric Colchicum constituents, such as sulfuric acid, hydrobromic acid.

In place of sodium hydroxide, there can be employed other strong bases which are capable of forming salts with phenolic and amphoteric Colchicum constituents.

The new compounds can be used, as has been stated hereinabove, with great advantage for the treatment of seeds to produce polyploidism. They may also be applied to soil for the same purpose. Aqueous solutions are used, for instance, for spraying seeds therewith or for immersing seeds therein.

Mixtures of said new Colchicum constituents according to the present invention with solid diluting agents such as with fertilizers, lime talcum, and the like, or in the form of aqueous solutions, may be applied to the soil in order to produce the desired effect.

Of course, many changes and variations in the solvents and reagents used for preparing O-demethyl-N-desacetyl-N-methyl colchicine, the acetate of O-demethyl-N-methyl colchicine, and tribenzoyl-O-demethyl-N-desacetyl-N-methyl colchiceine, in the reaction conditions, temperature and duration, in the methods of working up and purifying said compounds, in the manner in which said compounds are converted into suitable preparations useful in agriculture and for other purposes and the like may be made by those skilled in the art in accordance with the principles set forth herein and in the claims annexed hereto.

We claim:
1. The acetate of O-demethyl-N-methyl-colchicine of the formula

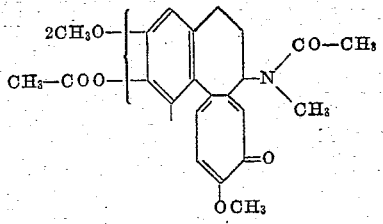

2. The tribenzoyl-O - demethyl-N - deacetyl-N - methyl colchiceine of the formula

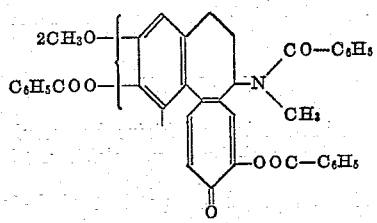

3. In a process of preparing O-demethyl-N-desacetyl-N-methyl colchicine, the steps which comprise dissolving the Colchicum alkaloids obtained by extracting Colchicum seeds with a solvent selected from the group consisting of water, water miscible lower alkanols, and mixtures of water miscible lower alkanols and halogenated lower aliphatic hydrocarbons in a water-immiscible organic solvent selected from the group consisting of chloroform, tetrachloro ethane, and trichloro ethylene, intimately mixing the resulting solution with an aqueous acid, thereby forming water-soluble acid addition salts of the basic components of said Colchicum constituents, removing the organic solvent phase, neutralizing the acid aqueous solution, mixing the neutralized aqueous solution with a water-immiscible organic solvent selected from the group consisting of chloroform, tetrachloro ethane, and trichloro ethylene, separating the resulting extract in the organic solvent from the aqueous solution, mixing the organic extract with an aqueous solution of a base, thereby converting amphoteric components of said Colchicum constituents into salts with said base, separating the basic aqueous solution from the organic solvent phase, acidifying and then neutralizing the basic aqueous solution, extracting said neutralized aqueous solution with a water-immiscible organic solvent selected from the group consisting of chloroform, tetrachloro ethane, and trichloro ethylene, separating the extract in the organic solvent from the aqueous solution, evaporating the organic solvent from the extract, and recrystallizing the evaporation residue to produce O-demethyl-N-desacetyl-N-methyl colchicine in crystalline form.

4. In a process of preparing O-demethyl-N-desacetyl-N-methyl colchicine, the steps which comprise dissolving the Colchicum alkaloids obtained by extracting Colchicum seeds with a solvent selected from the group consisting of water, water miscible lower alkanols, and mixtures of water miscible lower alkanols and halogenated lower aliphatic hydrocarbons in a water-immiscible organic solvent selected from the group consisting of chloroform, tetrachloro ethane, and trichloro ethylene, intimately mixing the resulting solution with an aqueous base solution, thereby forming water soluble salts of the phenolic components of said Colchicum constituents with the base, removing the organic solvent base, neutralizing the basic aqueous solution, mixing the neutralized aqueous solution with a water-immiscible organic solvent selected from the group consisting of chloroform, tetrachloro ethane, and trichloro ethylene, separating the resulting extract in the organic solvent from the aqueous solution, mixing the organic extract with an aqueous solution of an acid, thereby converting amphoteric components of said Colchicum constituents into acid addition salts, separating the acid aqueous solution from the organic solvent phase, neutralizing the acid aqueous solution, extracting said neutralized aqueous solution with a water-immiscible organic solvent selected from the group consisting of chloroform, tetrachloro ethane, and trichloro ethylene, separating the extract in the organic solvent from the aqueous solution, evaporating the organic solvent from the extract, and recrystallizing the evaporation residue to produce O-demethyl-N-desacetyl-N-methyl colchicine.

5. In a process of producing O-demethyl-N-desacetyl-N-methyl colchicine according to claim 3, wherein the crude O-demethyl-N-desacetyl-N-methyl colchicine is recrystallized from methanol.

6. In a process of preparing O-demethyl-N-desacetyl-N-methyl colchicine according to claim 4, wherein the crude O-demethyl-N-desacetyl-N-methyl colchicine is recrystallized from methanol.

References Cited in the file of this patent

Bruche: Chem. Abst. 46, 9255 (1952).
Santavy: Chem. Abst. 47, 4325–6 (1953).
Ueno: Chem. Abst. 48, 12755–7 (1954).